United States Patent Office …

3,330,665
COLD WATER SOLUBLE ACID COMPOSITIONS
John H. Van Ness, Kirkwood, and Darwin O. Stephens, Affton, Mo., assignors to Monsanto Company, St. Louis, Mo., a corporation of Delaware
No Drawing. Filed Mar. 17, 1964, Ser. No. 352,669
11 Claims. (Cl. 99—78)

This invention relates to granular acid compositions. More particularly, this invention relates to dry, stable granular acid compositions readily soluble in cold water.

It is well known that food grade adipic acid and fumaric acid are more effective acidulants than the generally heretofore utilized citric acid. In addition, fumaric acid and adipic acid are non-hygroscopic. However, fumaric acid and adipic acid have one serious drawback. This shortcoming is their exceedingly slow and low solubility in water, particularly cold water. At approximately room temperature, less than one part of fumaric acid, and only about one and a half parts of adipic acid, will slowly dissolve in 100 parts of water. By contrast, citric acid readily dissolves in less than its own weight of water at moderate temperatures.

Previous attempts to prepare cold water soluble acid compositions having improved storage stability have been concentrated upon admixing the powdered or milled acidulant with one or more surface active agents and a flow conditioning agent. Although these prior efforts have been satoisfactory for periods of relatively short sthorage, the prior art compositions tended to develop lumps or agglomerates after extended periods of storage, particularly under high ambient temperature and humidity conditions. This latter characteristic is very prominent when one or more of the selected surface active agents are normally viscous liquids. Such viscous surface active agents, in the presence of the prior art flow conditioning agents, have shown a tendency to migrate or "bleed" in the acid composition and form local concentrations causing agglomerates or lumps which inhibit, if not prohibit, rapid solution in cold water. Examples of such prior art flow conditioners include tricalcium phosphate, silica aerogel, calcium silicate, sodium aluminum silicate, sodium benzoate, and the like.

It has been found that the addition of a relatively small amount of a material having dispersant and soap building characteristics to an admixture of an acidulant and a surface active agent provides a granular acid composition which displays improved wetting characteristics, minimized migration or "bleeding" of normally viscous surface-active agents, and improved storage stability under relatively high ambient temperature and humidity conditions.

It is therefore an object of this invention to prepare granular acid compositions having improved storage stability.

Another object of this invention is to prepare granular acid compositions having improved storage stability and cold water solubility.

Another object of this invention is to prepare granular fumaric and/or adipic acid compositions having improved storage stability and cold water solubility.

Other objects and advantages will become apparent from the following description and examples.

According to the present invention, a stable granular cold water-soluble acid composition is prepared by admixing an acidulant selected from the group consisting of fumaric acid, adipic acid, or mixtures of the two, and a synergistic mixture comprising at least one anionic, nonionic or cationic surface-active agent and a material having dispersant and soap-building properties. The inherent properties of the soluble polyphosphates, in combination with a surface-active agent, provides a "wetting" or "detergency" effect which is greater than the combined effect of the polyphosphate and surface-active agent acting independently. The three essential components (namely, an acidulant, at least one surface-active agent and a material having dispersant and soap-building properties) can be admixed in a variety of ways to yield the improved granular cold-water acid composition. For example, the crystalline acidulants can be milled to a fine powder and thereafter suitably admixed with the surface-active agent and a material having dispersant and soap-building properties. Alternately, the acidulant and the surface-active agent can be admixed, milled to a fine powder, and subsequently a material having dispersant and soap-building properties is thoroughly blended therein. Likewise, the acidulant and the additives can be milled simultaneously.

The preferred method is to mix together in any suitable manner the acidulant and the surface-active gent, mill the resultant mixture, and thereafter the material having dispersant and soap-building properties is added to the milled mixture. This procedure provides a granular acid composition having a desired particle size without undue processing.

The commercially available acidulants are generally random sized crystalline materials having particles within the approximate size range of 25 to 250 microns. Although the particle size is not critical, it is preferred to enhance the solubility characteristics of the commercially available acidulants by reducing the average particle size to from about 20 to 50 microns. Such reduction can be effected by conventional means, such as most of the commercially available mills.

The surface-active agent can be added to the acidulant in any convenient manner. A surface-active agent which is generally solid can be admixed with the random sized acidulant particles prior to milling. It is equally possible to dissolve a solid surface-active agent in a suitable solvent and spray the resulting solution thereof onto the surfaces of the acidulant particles before, during or after milling. A surface-active agent which is normally liquid can be readily sprayed onto the acidulant particles as received, or dissolved in a suitable solvent and sprayed as a dilute solution. It is generally preferred to spray a dilute solution of a surface-active agent onto the acidulant particles with mixing to insure adequate blending, and thereafter mill the resulting mixture, yielding a surface-active agent acidulant mixture having a desired particle size. Since some of the surface-active agents contemplated possess foaming tendencies, it may be desirable to incorporate small amounts of inert anti-foam compositions, such as dimethylpolysiloxane and silica, a commercially available item, in the ratio, by weight, of siloxane surface-active agent of approximately 1:25–50. Simple testing will readily ascertain the requisite amount required, if any. It is understood, however, that foaming and non-foaming surface-active agents are equally effective to promote the solubility of the acid particles.

The surface-active agents contemplated within the present invention must be compatible with the acidulant and the material having dispersant and soap building properties, capable of wetting the surface of said acid particles and readily miscible with water. It is understood, of course, that surface-active agents utilized in food products must also be non-toxic. Further, the preferred surface-active agents are those which display a minimum of foaming properties when dissolved in water.

Representative examples of suitable non-ionic surface-active agents include polyethenoxy ethers of alkyl phenols, polyethenoxy ethers of alcohols, difunctional and polyfunctional polyethenoxy esters, polyethenoxy esters, polyethoxy compounds with amide links, polyhydroxy esters, polyoxy propylene glycol esters, etc.

Representative examples of suitable anionic surface-active agents include carboxylic acids with intermediate links, monoglycerides, monoglycol esters of fatty acids, sulfuric esters such as alkyl alkali metal sulfates, sulfated partially etherified glycerols, esters and ether linked sulfonates, amide linked sulfonates, higher alkyl aryl sulfonates, etc.

Representative examples of cationic surface-active agents include non-quaternary nitrogen bases such as formed by the condensation reaction of ethylene oxide with a primary amine, which can also have ester and ether intermediate linkages, quaternary nitrogen bases such as formed by the reaction of lead tertiary amine with alkyl halide or sulfate, etc.

It is also understood that more than one surface-active agent may be used and selected from more than one general class; that is, one or more non-ionic surface-active agents can be mixed with one or more anionic or cationic surface-active agents. However, it is further understood that anionic and cationic surface-active agents are not to be mixed together.

The preferred classes of surface-active agents are the non-ionic and the anionic surface-active agents, particularly when incorporated into an acid composition utilized as an acidulant in foods for human consumption.

The proportion of surface-active agent used is at least 0.01% by weight of the acidulant, and preferably between about 0.1% and about 1% of the acidulant. Acid compositions having less than about 0.1% of surface-active agent, although displaying some improved solubility, generally fail to exhibit the desired improved solubility, whereas more than about 1% of surface-active agent serves no useful purpose.

The materials having dispersant and soap-building properties contemplated in accordance with this invention are the alkali metal salts of polyphosphates. There are three known groups of crystalline alkali metal polyphosphates; the metaphosphates, the tripolyphosphates and the pyrophosphates. Each of these groups has a definite $Na_2O:P_2O_5$ composition. It is preferred to select a polyphosphate which is a water soluble, relatively non-hygroscopic, free-flowing, finely divided solid compatible with the acidulant and is well known for its soap- and detergent-building characteristics. Representative examples of suitable alkali metal salts of polyphosphates include disodium pyrophosphate ($Na_2H_2P_2O_7$), tetrasodium pyrophosphate ($Na_4P_2O_7$), sodium tripolyphosphate

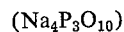

$$(Na_5P_3O_{10})$$

sodium tetraphosphate ($Na_6P_4O_{13}$), etc. The preferred compounds are disodium acid pyrophosphate (hereinafter referred to as SAPP) and tetrasodium pyrophosphate (hereinafter referred to as TSPP). It is understood that this material possesses an average particle size not substantially greater than the average particle size of the acidulant used to make up the present acid composition.

To attain the synergistic action with the surface active agent, the above-identified materials having detergent- and soap-building properties must be present in amounts from about 0.2% to about 10% by weight of the acidulant, and preferably about 3%. When smaller amounts are used, the synergistic action between the surface-active agent and the material having detergent- and soap-building properties is minimized. Amounts in excess of 10% provide no useful properties.

The invention and the manner in which it accomplishes its object will be readily understood by reference to the following specific examples of preferred embodiments thereof. Unless otherwise specified, all proportions in these embodiments and throughout the specification are expressed in parts by weight of the acidulant.

EXAMPLE I

About 200 grams of dry crystalline fumaric acid, having a particle size such that substantially all of the material passes through a 60-mesh screen and is retained in a 325-mesh screen, is placed in a bowl and sprayed with an approximately 25 ml. solution containing 0.8 gram of sodium dioctyl sulfosuccinate (an anionic surface-active agent).

When the solution is thoroughly blended with the fumaric acid, the solvent is evaporated from the resultant mixture by gentle heating until substantially dry. The resulting dried mixture contains approximately 0.4% sodium dioctyl sulfosuccinate and is milled to provide an acid mixture having an average particle size of about 325 mesh.

A 30-gram portion of the milled 0.4% sodium dioctyl sulfosuccinate-treated fumaric acid is admixed with 0.9 gram (3%) tetrasodium pyrophosphate (TSPP) and thereafter milled again to thoroughly blend the TSPP with the acid mixture and insure substantially uniformly sized particles. A 3.3 gram sample of the resulting acid composition is placed in a paper envelope, the envelope is sealed and thereafter stored at relatively high temperature and humidity conditions. After 4 weeks storage, the acid composition remained cake-free, wetted readily and dissolved in less than one minute in approximately 2 quarts of 4° C. water, with a minimum of stirring.

EXAMPLE II

Example I is repeated using disodium acid pyrophosphate ($Na_2H_2P_2O_7$, hereinafter referred to as SAPP). The solubility characteristics of the acid composition are shown in Table I.

Examples III and IV utilize the procedures set forth in Examples I and II, except that the quantity of dispersant and soap builder (polyphosphates) is reduced to 1.5% by weight of said acid. Example V also utilizes a decreased amount of surface-active agent. The solubility characteristics of the acid compositions of Examples III, IV and V are shown in Table I.

These procedures are repeated utilizing various types of surface-active agents. Examples VI, VII, VIII and IX utilize a non-ionic surface-active agent, Examples X and XI also utilize an anionic surface-active agent, and Examples XII and XIII utilize a cationic surface-active agent. Examples XIV, XV and XVI are control samples for comparison purposes utilizing the same procedure set forth in Example I except that no dispersant and soap builder is used in Example XIV and no surface-active agent is utilized in Examples XV and XVI.

TABLE I

| Ex. | Percent | Surface-Active Agent | Type Surface-Active Agent | T., °C. | Percent | Dispersant and Soap Builder | A | B | C | D |
|---|---|---|---|---|---|---|---|---|---|---|
| I | 0.4 | Sodium Dioctyl Sulfosuccinate | Anionic | 4 | 3.0 | TSPP | 1.0 | 0.5 | OK | OK. |
| II | 0.4 | ----do---- | ----do---- | 4 | 3.0 | SAPP | 1.0 | 0.3 | OK | OK. |
| III | 0.4 | ----do---- | ----do---- | 4 | 1.5 | TSPP | 0.3 | 0.7 | OK | OK. |
| IV | 0.4 | ----do---- | ----do---- | 4 | 1.5 | SAPP | 1.0 | 0.5 | Slight | Very Good. |
| V | 0.125 | ----do---- | ----do---- | 4 | 1.5 | TSPP | 3.0 | 0.7 | OK | OK. |
| VI | 0.5 | Polyoxyethylene Sorbitan Stearate | Non-Ionic | 4 | 1.5 | TSPP | 2.0 | 0.7 | OK | OK. |
| VII | 0.5 | ----do---- | ----do---- | 4 | 3.0 | TSPP | 2.0 | 0.5 | OK | OK. |
| VIII | 0.7 | ----do---- | ----do---- | 4 | 1.5 | TSPP | 1.5 | 1.0 | OK | OK. |
| IX | 0.7 | ----do---- | ----do---- | 4 | 3.0 | TSPP | 1.0 | 0.7 | OK | OK. |
| X | 0.4 | Sodium Lauryl Sulfate | Anionic | 4 | 1.5 | TSPP | 2.0 | 0.5 | OK | OK. |
| XI | 0.4 | ----do---- | ----do---- | 4 | 3.0 | TSPP | 1.0 | 0.3 | OK | OK. |
| XII | 0.05 | Methyl Dodecylbenzyl Trimethyl Ammonium Chloride. | Cationic | 22 | 3.0 | SAPP | 1.0 | 3.0 | OK | OK. |
| XIII | 0.05 | ----do---- | ----do---- | 22 | 3.0 | TSPP | 1.0 | 3.0 | OK | OK. |
| XIV | 0.05 | ----do---- | ----do---- | 22 | | None | 21 minutes to dissolve | | | |
| XV | | None | | 4 | 1.5 | TSPP | 4.0 | 0.5 | Mod | Good. |
| XVI | | ----do---- | | 4 | 1.5 | SAPP | 4.0 | 0.5 | Mod | Do. |

CODE.—A=Surface condition after 1 minute agitation (Score 1–10). B=Solids (undissolved after 1 minute agitation (Score as A)). C=Foam (Score OK, slight, moderate, heavy). D=Wetting (Score OK, less than 1 minute, good, fair, poor).

To illustrate the synergistic action between the material having dispersant and soap-building properties and the surface-active agent relative to the enhanced solubility characteristics of an acid composition prepared according to this invention, a series of acid compositions are prepared wherein the percentage of surface-active agent remains the same, and the percentage of dispersing agent varies. The results are set forth in Table II.

TABLE II

| Dispersant-Soap Builder—SAPP (by weight of Fumaric Acid), Percent | Wetting Agent Sodium Lauryl Sulfate (by weight of Fumaric Acid), Percent | Wetting Time—1 Part Fumaric Acid Composition in 100 Parts Water at 22° C. |
|---|---|---|
| 5 | | 17 Min.+ |
| | 0.5 | 2 Sec. |
| | 0.125 | 10 Min. |
| 2.25 | 0.125 | 5¼ Min. |
| 5.0 | 0.125 | 4½ Min. |
| 10.0 | 0.125 | 3½ Min. |

It can therefore be seen that SAPP and sodium lauryl sulfate, singly, at a level of 5% and 0.125%, respectively, fail to contribute significant solubility enhancement. However, the synergism exerted by the combination of SAPP and sodium lauryl sulfate shows a significant and totally unexpected solubility improvement.

Numerous modifications will readily suggest themselves to those skilled in the art. Thus, while the invention has been described with particular reference to specific embodiments, it is to be understood that it is not to be limited thereto but is to be construed broadly and restricted solely by the scope of the appended claims.

The embodiments of the invention in which an exclusive property or privilege is claimed are defined as follows:

1. A stable, free-flowing acid composition readily soluble in cold water, which comprises a powdered acidulant selected from the group consisting of fumaric acid and adipic acid and a synergistic mixture of a stable, water-soluble alkali metal polyphosphate selected from the group consisting of disodium acid pyrophosphate, tetrasodium pyrophosphate, sodium tripolyphosphate and sodium tetraphosphate and at least one surface-active agent selected from the group consisting of anionic, cationic and non-ionic surface-active agents.

2. A stable, free-flowing acid composition readily soluble in cold water, which comprises a powdered acidulant selected from the group consisting of fumaric acid and adipic acid and a synergistic mixture of at least 0.2% by weight of said acid of a stable, water-soluble alkali metal polyphosphate selected from the group consisting of disodium acid pyrophosphate, tetrasodium pyrophosphate, sodium tripolyphosphate and sodium tetraphosphate and at least 0.01% by weight of said acid of a surface-active agent selected from the group consisting of anionic, cationic and non-ionic surface-active agents.

3. An acid composition in accordance with claim 2 wherein said acidulant is fumaric acid.

4. An acid composition in accordance with claim 2 wherein said acidulant is adipic acid.

5. An acid composition in accordance with claim 2 wherein said acidulant is fumaric acid and said water-soluble alkali metal polyphosphate is disodium acid pyrophosphate.

6. An acid composition in accordance with claim 2 wherein said acidulant is fumaric acid and said water-soluble alkali metal polyphosphate is tetrasodium pyrophosphate.

7. An acid composition in accordance with claim 2 wherein said acidulant is adipic acid and said water-soluble alkali metal polyphosphate is disodium acid pyrophosphate.

8. An acid composition in accordance with claim 2 wherein said acidulant is adipic acid and said water-soluble alkali metal polyphosphate is tetrasodium pyrophosphate.

9. A stable, free-flowing acid composition readily soluble in cold water, which comprises a powdered acidulant selected from the group consisting of fumaric acid and adipic acid, at least 0.2% by weight of said acid of disodium acid pyrophosphate and at least 0.01% by weight of said acid of a surface-active agent selected from the group consisting of anionic, cationic and non-ionic surface-active agents.

10. A stable, free-flowing acid composition readily soluble in cold water, which comprises a powdered acidulant selected from the group consisting of fumaric and adipic acid, at least 0.2% by weight of said acid of tetrasodium pyrophosphate and at least 0.01% by weight of said acid of a surface-active agent selected from the group consisting of anionic, cationic and non-ionic surface-active agents.

11. A stable, free-flowing, non-bleeding acid composition readily soluble in cold water, which comprises a powdered acidulant selected from the group consisting of fumaric acid or adipic acid, and a synergistic mixture of at least 0.2% by weight of said acid of a stable, water-soluble alkali metal polyphosphate selected from the group consisting of disodium acid pyrophosphate, tetrasodium pyrophosphate, sodium tripolyphosphate and sodium tetraphosphate, and at least 0.01% by weight of said acid of a normally viscous surface-active agent.

No references cited.

A. LOUIS MONACELL, *Primary Examiner.*

M. VOET, *Assistant Examiner.*